3,215,686
MONOAZO DYESTUFFS
Werner Zerweck and Richard Fleischhauer, Frankfurt am Main, and Heinz Bender, Bergen-Enkheim, Kreis Hanau, Germany, assignors to Cassella Farbwerke Mainkur Aktiengesellschaft, Frankfurt am Main, Fechenheim, Germany, a company of Germany
No Drawing. Filed Jan. 21, 1963, Ser. No. 252,605
Claims priority, application Germany, Jan. 22, 1962, C 26,101
1 Claim. (Cl. 260—162)

This invention relates to new and valuable yellow monoazo dyestuffs having the formula

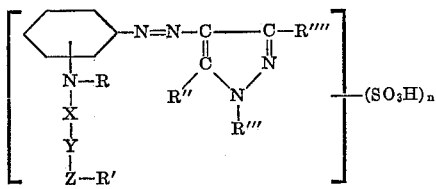

in which

X is a bivalent radical of the group consisting of $SO_2$ and CO,
Y is a radical of the group consisting of ethylene and vinylene,
Z is a bivalent radical of the group consisting of $SO_2$, SO, O and S,
R is a substituent of the group consisting of a hydrogen atom and the radical R',
R' is a radical of the group consisting of alkyl, aryl, aralkyl and cycloalkyl,
R'' is a substituent of the group consisting of OH and $NH_2$,
R''' is a substituent of the group consisting of a hydrogen atom, alkyl and aryl,
R'''' is a radical of the group consisting of methyl, phenyl, carboxyl, carbamido and carbalkoxy, and
n is an integer consisting of 0 and 1.

The new monoazo dyestuffs may be obtained by known coupling or acylating procedures, namely by coupling diazo compounds of aminophenylacylamines which may be further substituted in the phenyl residue and wherein the acylamino residue corresponds to the formula

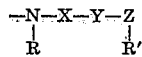

with pyrazols of the formula

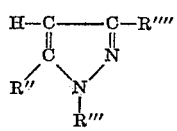

wherein X, Y, Z, R, R', R'', R''' and R'''' have the foregoing meaning, or by acylating monoazo dyestuffs containing free amino groups instead of acylated amino groups with halides or anhydrides of organic acids containing the residue —X—Y—Z—R' and by selecting the components in such a manner that the resultant dyestuffs contain not more than one sulfonic acid group.

The dyestuffs may be used for the dyeing of animal, vegetable and synthetic fibers; they particularly distinguish themselves by yielding, when dyed or printed on cellulose fibers, dyeings and printings which are fast to washing, whereby they react in the form of their solutions or suspensions with these fibers in the presence of alkaline active agents especially at an elevated temperature or by dry heating.

On the one hand, the dyestuffs are resistant to alkaline active agents, and on the other hand, they may be fixed on the fiber with a good yield so that full dyeings and printings are obtained having very good wet fastness properties and a very good fastness to light.

The following examples are given for the purpose of illustrating the present invention. Where not otherwise stated, the temperatures given are in degrees centigrade.

Example 1

38.4 kg. 3-(β-phenylsulfonylpropionylamino)-1-aminobenzene-6-sulfonic acid in the form of its sodium salt are dissolved in water, admixed with 6.9 kg. sodium nitrite and diazotized at 15–20° by allowing the mixture to run into ice and hydrochloric acid. The diazo suspension obtained is combined, in the presence of excess sodium acetate, with an aqueous suspension of about 10.3 kg. 3-methyl-5-pyrazolone. The dyestuff precipitated is filtered off and dried. It represents a yellow powder and it yelds on cotton, when printed in the presence of sodium carbonate, urea and alginate thickening and subsequently dried, steamed, rinsed and soaped, greenish yellow printings of a very good fastness to washing and light. The good fastness to light is retained even after crease-proof finishing.

Example 2

24.2 kg. 1-amino-3-(β-methylsulfonylpropionylamino)-benzene are admixed, whilst stirring, with ice and hydrochloric acid and diazotized in the usual manner. The resultant diazo solution is introduced, in the presence of excess sodium acetate, into an aqueous solution of 26.7 kg. 1-(4'-sulphophenyl)-3-methyl-5-pyrazolone. The dyestuff thus obtained is precipitated with potassium chloride, filtered off and dried. It forms a yellow water-soluble powder and yields, when applied on cotton as indicated in Example 1 or according to the padding process or to the cold pad batch dyeing method, yellow dyeings of a very good fastness to light and wet processing. The fixation is very good.

The before-mentioned dyestuffs may also be prepared by starting from the monoazo dyestuffs obtained by combining the diazo compounds of 3-nitro-1-aminobenzene or 3-acetylamino-1-aminobenzene with 1-(4'-sulfophenyl)-3-methyl-5-pyrazolone, by converting these monoazo dyestuffs by reduction or saponification into the aminoazo dyestuff and by acylating the latter in the presence of sodium bicarbonate with the chloride or anhydride of the β-methylsulfonyl-propionic acid.

A dyestuff of similar properties, but of a more greenish shade is obtained when using 1-(2′,5′-dichloro-4′-sulfophenyl)-3-methyl-5-pyrazolone. Also this dyestuff may be readily fixed on cotton.

The following table enumerates some further dyestuffs which may be obtained according to the process of the present invention:

| Diazo component | Coupling component | Shade |
|---|---|---|
| 4-NH$_2$-C$_6$H$_4$-NH.CO.CH$_2$.CH$_2$.SO$_2$CH$_3$ | 3-methyl-5-pyrazolone | Greenish yellow. |
| NH$_2$-C$_6$H$_4$-NH.CO.CH$_2$.CH$_2$.SO$_2$.CH$_3$ | ----do---- | Reddish yellow. |
| NH$_2$-C$_6$H$_4$-NH.CO.CH$_2$.CH$_2$.SO$_2$.C$_2$H$_5$ | 1-(2′,5′-dichloro-4′-sulfophenyl)-3-methyl-5-pyrazolone. | Greenish yellow. |
| NH$_2$-C$_6$H$_4$-NH.CO.CH$_2$.CH$_2$.SO$_2$.CH$_3$ | 1-(2′-sulfophenyl)-3-phenyl-5-pyrazolone. | Reddish yellow. |
| NH$_2$-C$_6$H$_4$-NH.CO.CH$_2$.CH$_2$.SO$_2$.CH$_3$ | 1-(3′-sulfophenyl)-3-methyl-5-pyrazolone | Do. |
| NH$_2$-C$_6$H$_4$-NH.CO.CH$_2$.CH$_2$.SO$_2$.CH$_3$ | 1-(4′-sulfophenyl)-3-methyl-5-pyrozolone | Do. |
| NH$_2$-C$_6$H$_4$-NH.CO.CH$_2$.CH$_2$.SO$_2$.CH$_3$ | 5-pyrazolone-3-carboxylic acid | Do. |
| NH$_2$-C$_6$H$_4$-NH.CO.CH$_2$.CH$_2$.SO$_2$.CH$_3$ | 1-(4′-sulfophenyl)-5-pyrazolone-3-carboxylic acid ethyl ester. | Do. |
| NH$_2$-C$_6$H$_4$-NH.CO.CH$_2$.CH$_2$.SO$_2$.CH$_3$ | 1-(4′-sulfophenyl)-5-pyrazolone-3-carboxylic acid. | Do. |

| Diazo component | Coupling component | Shade |
|---|---|---|
| 4-NH₂-C₆H₄-NH.CO.CH₂.CH₂.SO₂.CH₃ | 1-(2'-methyl-4'-sulfophenyl)-5-pyrazolone-3-carboxylic acid. | Reddish yellow. |
| 4-NH₂-C₆H₄-NH.CO.CH₂.CH₂.SO₂.CH₃ | 1-(2'-methyl-4'-sulfophenyl)-3-methylpyrazolone. | Do. |
| 4-NH₂-C₆H₄-NH.CO.CH₂.CH₂.SO₂.CH₃ | 1-(2'-chloro-5'-sulfophenyl)-3-methyl-5-pyrazolone. | Yellow. |
| 4-NH₂-C₆H₄-NH.CO.CH₂.CH₂.SO₂.CH₃ | 1-(2'-chloro-6'-methyl-4'-sulfophenyl)-3-methyl-5-pyrazolone. | Do. |
| 1-SO₃H-2-NH₂-4-NH.CO.CH₂.CH₂.SO₂.CH₃-C₆H₃ | 1-phenyl-3-methyl-5-pyrazolone | Do. |
| 1-SO₃H-2-NH₂-4-NH.CO.CH₂.CH₂.SO₂.CH₃-C₆H₃ | 1-(3'-chlorophenyl)-3-methyl-5-pyrazolone | Greenish yellow. |
| 1-SO₃H-2-NH₂-4-NH.CO.CH₂.CH₂.SO₂.CH₃-C₆H₃ | 1-(phenyl)-3-methyl-5-aminopyrazol | Yellow. |
| 1-SO₃H-2-NH₂-4-NH.CO.CH₂.CH₂.SO₂.CH₃-C₆H₃ | 3-methyl-5-pyrazolone | Greenish yellow. |
| 1-SO₃H-2-NH₂-4-NH.CO.CH₂.CH₂.SO₂-C₆H₅-C₆H₃ | 1-(3'-carboxyphenyl)-3-methyl-5-pyrazolone | Yellow. |

| Diazo component | Coupling component | Shade |
|---|---|---|
| SO₃H–C₆H₃(NH₂)–NH.CO.CH₂.CH₂.SO₂–C₆H₅ | 1-phenyl-5-pyrazolone-3-carboxylic acid | Yellow. |
| SO₃H–C₆H₃(NH₂)–NH.CO.CH₂.CH₂.SO₂–C₆H₅ | 5-pyrazolone-3-carboxylic acid | Do. |
| SO₃H–C₆H₃(NH₂)–NH.CO.CH₂.CH₂.SO₂–C₆H₅ | 5-pyrazolone-3-carboxylic acid amide | Do. |
| SO₃H–C₆H₃(NH₂)–NH.CO.CH₂.CH₂.SO₂CH₃ | 3-methyl-5-pyrazolone | Reddish yellow. |
| SO₃H–C₆H₃(NH₂)–NH.CO.CH₂.CH₂.SO₂CH₃ | 1-phenyl-3-methyl-5 pyrazolone | Do. |
| SO₃H–C₆H₃(NH₂)–NH.CO.CH₂.CH₂.SO₂CH₃ | 1-(3'-chlorophenyl)-3-methyl-5-pyrazolone | Yellow. |
| SO₃H–C₆H₃(NH₂)–NH.CO.CH₂.CH₂.O–C₆H₅ | 3-methyl-5-pyrazolone | Reddish yellow. |
| SO₃H–C₆H₃(NH₂)–NH.CO.CH₂.CH₂.O–C₆H₅ | ......do...... | Greenish yellow. |
| SO₃H–C₆H₃(NH₂)–NH.CO.CH₂CH₂.S–C₆H₅ | ......do...... | Do. |

| Diazo component | Coupling component | Shade |
|---|---|---|
| SO₃H–C₆H₃(NH₂)–NH.CO.CH₂.CH₂.S.C₂H₅ | 3-methyl-5-pyrazolone | Greenish yellow. |
| SO₃H–C₆H₃(NH₂)–NH.CO.CH₂.CH₂.SO.C₂H₅ | ___do___ | Do. |
| SO₃H–C₆H₃(NH₂)–NH.SO₂.CH₂.CH₂.SO–C₆H₅ | ___do___ | Reddish yellow. |
| NH₂–C₆H₄–N(CH₃)–CO.CH₂.CH₂.SO₂.C₂H₅ | 1-(4'-sulfophenyl)-3-methyl-5-prazolone | Yellow. |
| NH₂–C₆H₃(COOH)–NH.CO.CH₂.CH₂.SO₂–C₆H₅ | ___do___ | Greenish yellow. |
| COOH–C₆H₃(NH₂)–NH.CO.CH₂.CH₂.SO₂–C₆H₅ | ___do___ | Do. |
| NH₂–C₆H₃(Cl)–NH.CO.CH₂.CH₂.SO₂.CH₃ | ___do___ | Do. |
| NH₂–C₆H₃(Cl)–NH.CO.CH₂.CH₂.SO₂CH₃ | ___do___ | Do. |
| CH₃–C₆H₃(NH₂)–NH.CO.CH₂CH₂.SO₂CH₃ | ___do___ | Yellow. |

| Diazo component | Coupling component | Shade |
|---|---|---|
| 4-amino-2-methyl-1-(β-methylsulfonylpropionylamino)benzene (H₃C—C₆H₃(NH₂)—NH.CO.CH₂CH₂.SO₂.CH₃) | 1-(4'-sulfophenyl)-3-methyl-5-pyrazolone | Yellow. |
| 4-amino-3-methyl-1-(β-methylsulfonylpropionylamino)benzene (C₆H₃(NH₂)(CH₃)—NH.CO.CH₂.CH₂.SO₂CH₃) | ...do... | Do. |
| 4-amino-2-methoxy-1-(β-methylsulfonylpropionylamino)benzene (H₃CO—C₆H₃(NH₂)—NH.CO.CH₂.CH₂.SO₂CH₃) | ...do... | Reddish yellow. |
| 4-amino-2,5-dimethyl-1-(β-methylsulfonylpropionylamino)benzene (CH₃, CH₃ substituted C₆H₂(NH₂)—NH.CO.CH₂.CH₂.SO₂CH₃) | ...do... | Yellow. |
| 4-amino-1-(β-methylsulfonylpropionylamino)benzene (C₆H₄(NH₂)—NH.CO.CH₂.CH₂.SO₂CH₃) | 1-[(4'-β-methylsulfonylpropionylamino)-2'-sulfophenyl)]-3-methyl-5-pyrazolone. | Reddish yellow. |
| 1-amino-4-(β-phenoxyethylsulfonylamino)benzene (C₆H₄(NH₂)—NH.SO₂.CH₂CH₂.O—C₆H₅) | 1-(2',5'-dichloro-4'-sulfophenyl)-3-methyl-5-pyrazolone. | Greenish yellow. |
| 1-amino-2-sulfo-4-(β-phenylthiopropionylamino)benzene (HO₃S—C₆H₃(NH₂)—NH.CO.CH₂CH₂.S—C₆H₅) | 3-methyl-5-pyrazolone | Do. |
| 1-amino-2-sulfo-4-(β-phenylsulfinylpropionylamino)benzene (HO₃S—C₆H₃(NH₂)—NH.CO.CH₂CH₂.S(O)—C₆H₅) | ...do... | Do. |
| 1-amino-2-sulfo-4-(β-phenylsulfonylvinylcarbonylamino)benzene (HO₃S—C₆H₃(NH₂)—NH.CO.CH=CH.SO₂—C₆H₅) | ...do... | Do. |
| 1-amino-2-sulfo-4-(β-phenoxyvinylcarbonylamino)benzene (HO₃S—C₆H₃(NH₂)—NH.CO.CH=CH.O—C₆H₅) | ...do... | Do. |
| 1-amino-4-[N-ethyl-N-(β-phenylsulfonylpropionyl)amino]benzene (C₆H₄(NH₂)—N(CH₂CH₃)—CO.CH₂CH₂.SO₂—C₆H₅) | 1-(4'sulfophenyl)-pyrazolone-3-carboxylic acid. | Reddish yellow. |

| Diazo component | Coupling component | Shade |
|---|---|---|
| (structure: aniline with N-CH(CH₂CH₃)(CH₂CH₃) and CO.CH₂CH₂.SO₂—phenyl) NH₂ | 1-(4'-sulfophenyl)-pyrazolone-3-carboxylic acid | Reddish yellow. |
| (structure: NH₂-aryl-N(cyclohexyl)(CO.CH₂CH₂SO₂CH₃)) | ----do---- | Do. |
| (structure: NH₂-aryl-N(CH₂-phenyl)(COCH₂.CH₂.SO₂.CH₃)) | ----do---- | Do. |
| (structure: NH₂-aryl—NH.CO.CH₂CH₂.SO₂.CH₂—phenyl) | ----do---- | Yellow. |

It will be understood that this invention is susceptible to further modification and, accordingly, it is desired to comprehend such modifications within this invention as may fall within the scope of the appended claim.

We claim:

A compound of the formula

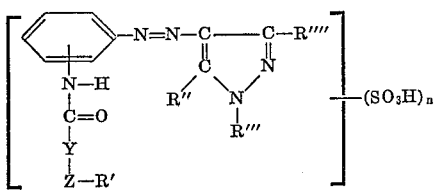

in which

Y is a radical selected from the group consisting of ethylene and vinylene,

Z is a bivalent radical selected from the group consisting of SO₂, SO, and S,

R' is a radical selected from the group consisting of lower alkyl, phenyl, and benzyl, R'' is a substituent selected from the group consisting of OH and NH₂, R''' is a substituent selected from the group consisting of hydrogen and phenyl, R'''' is a radical selected from the group consisting of methyl, phenyl, carboxyl, carbamido, and lower carbalkoxy, n is an integer consisting of 0 and 1.

References Cited by the Examiner

UNITED STATES PATENTS 1,594,867  8/26  Zitscher _____ 260—162 X

FOREIGN PATENTS 520,239  3/31  Germany.

CHARLES B. PARKER, *Primary Examiner.*